July 11, 1961  E. A. CHAPIN  2,991,769
PISTON AND PISTON COOLING MEANS
Filed April 27, 1959  3 Sheets-Sheet 3
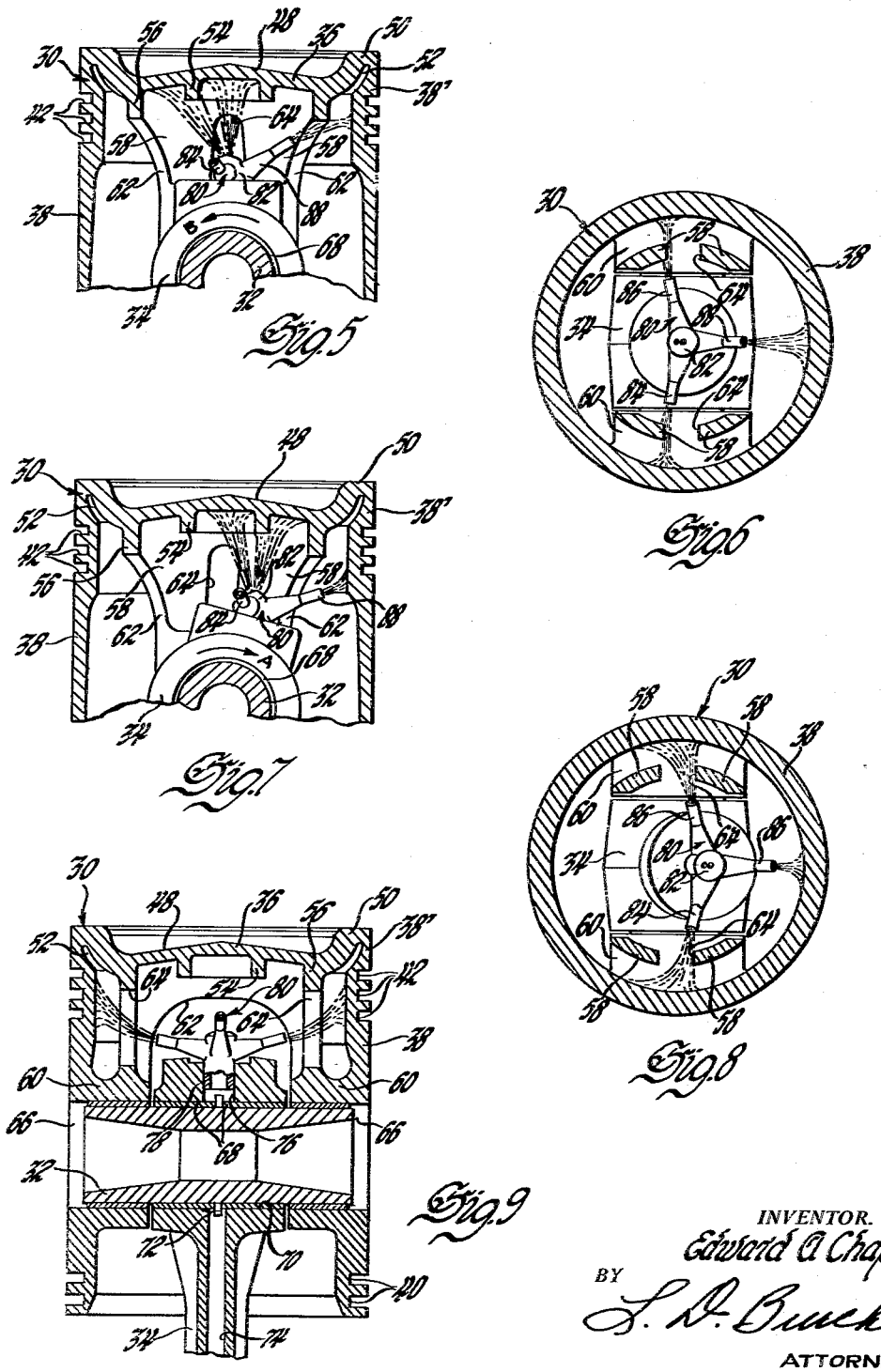
INVENTOR.
Edward A Chapin
BY
ATTORNEY

United States Patent Office 2,991,769
Patented July 11, 1961

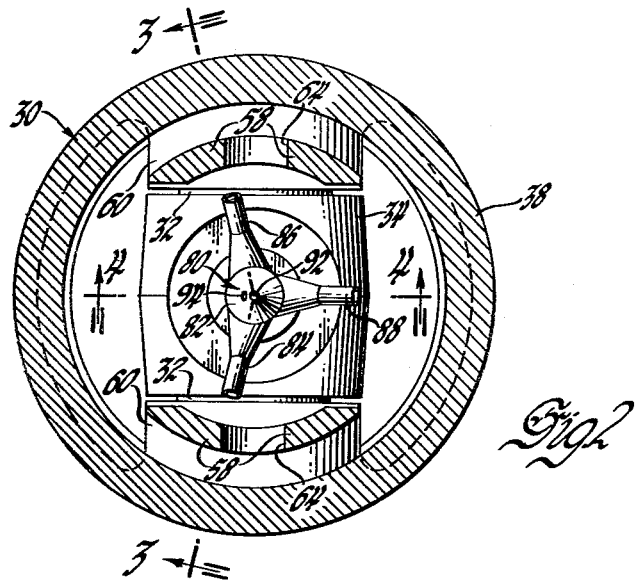
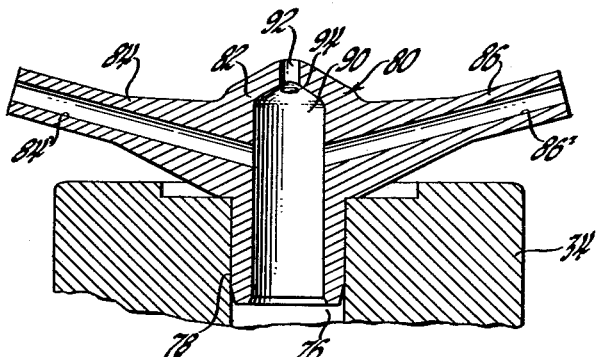
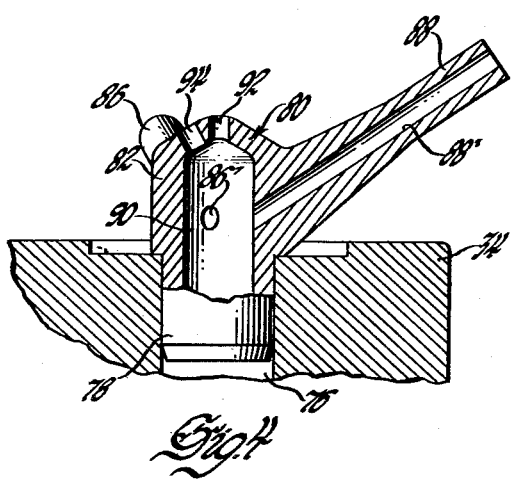

2,991,769
PISTON AND PISTON COOLING MEANS
Edward A. Chapin, Flat Rock, Mich., assignor to General Motors Corporation, Detroit, Mich., a corporation of Delaware
Filed Apr. 27, 1959, Ser. No. 809,011
5 Claims. (Cl. 123—41.35)

This invention relates to an internal combustion engine, and more particularly to a piston and piston cooling means for such an engine.

The head or crown of an internal combustion engine piston must necessarily be designed to withstand extreme cyclic thrust and thermal load conditions. Such load conditions are imposed by the repetitive explosive combustions which occur within the expansible combustion chamber partially defined by the piston. The piston head, however, should be made as light as possible consistent with operational durability to limit the total reciprocating mass of the piston and thereby the inertial loads imposed on the several associated engine components. In certain high compression, high output applications it is necessary to supplement the normal metallic conduction cooling of the piston head with an auxiliary means, such as the spraying or splashing of oil on the underside of the piston crown with subsequent transfer of heat to the cooling oil. Such auxiliary cooling is particularly necessary in relatively high speed, two-cycle engines wherein the power impulses and accompanying heat transfers occur at twice the frequency of those in a four-cycle engine operating at the same speed. Where insufficient cooling of the piston is provided various types of extreme piston failures may occur, such as burning of the piston crown, cracking of the piston rim, and destructive piston seizures. Insufficient piston cooling may also result in ovalizing of the piston, in piston ring clamping and in insufficient lubrication of the cylinder walls with resultant scuffing of the pistons, piston rings and cylinders.

The invention contemplates a piston construction having a relatively light reinforced head or crown portion in combination with a spray nozzle carried by the connecting rod and adapted to sequentially spray cooling oil passing thereto through a supply passage in the connecting rod to insure proper cooling of the piston crown rim and ring mounting skirt portions.

The foregoing and other objects, advantages and features of the invention will be more thoroughly understood from the following description of a preferred embodiment having reference to the attached drawings, in which:

FIGURE 2 is a sectional view taken substantially in the plane of the line 2—2 of FIGURE 1;

FIGURE 3 is an enlarged sectional view taken substantially on the line 3—3 of FIGURE 2;

FIGURE 4 is an enlarged sectional view taken substantially on the line 4—4 of FIGURE 2;

Figure 1:
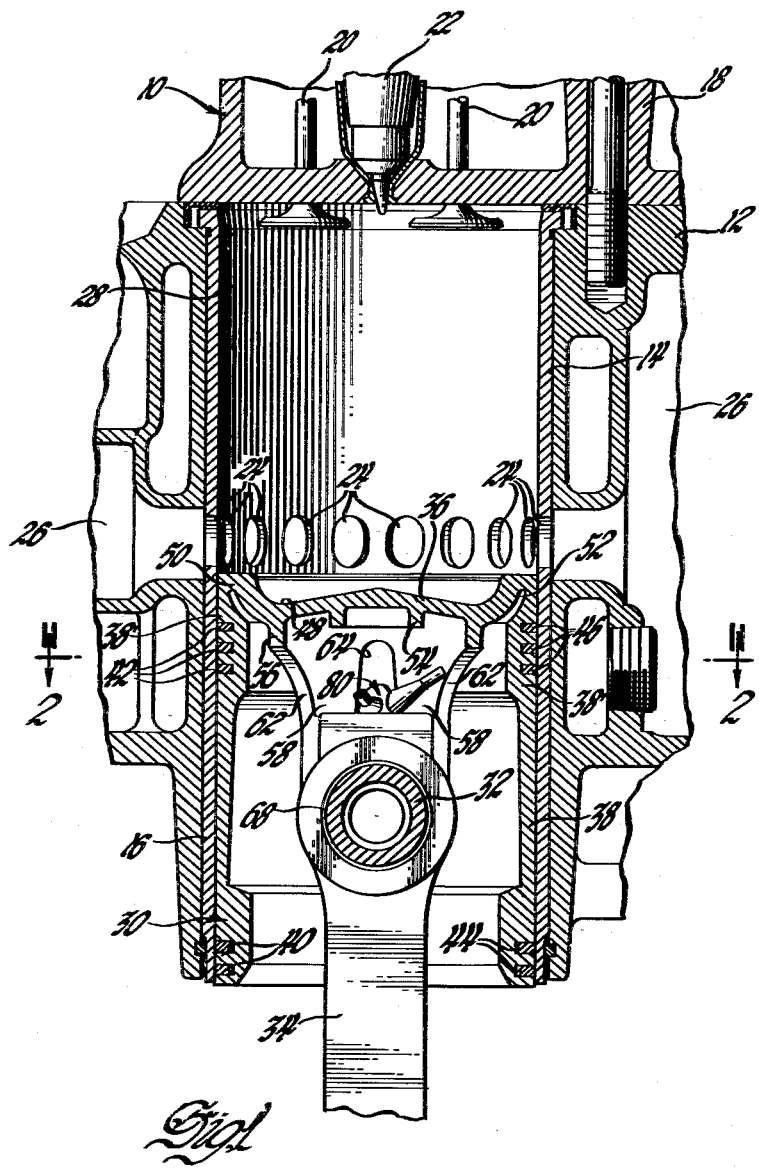
FIGURE 1 is a sectional view through a portion of a two-cycle uniflow internal combustion engine and illustrates the combination of a piston, connecting rod and a piston cooling oil spray nozzle constructed in accordance with the invention.

FIGURES 5 and 6 are views similar to FIGURES 1 and 2 showing the oil jet distribution occurring approximately 180° of crankshaft rotation after top dead center;

FIGURES 7 and 8 are sectional views similar to FIGURES 5 and 6 showing the oil jet distribution approximately 75° of crankshaft rotation after top dead center; and FIGURE 9 is a view similar to FIGURES 5 and 7 but transverse thereto.

Referring more particularly to FIGURE 1, a two-cycle compression ignition, internal combustion engine of uniflow scavenged design is indicated generally at 10. The engine comprises a cylinder block 12 having a bore 14 extending therethrough. The bore 14 slidably mounts a cylinder sleeve or liner 16 and is sealingly closed at one end thereof by a cylinder head 18 suitably secured to the block. Exhaust valves 20 are reciprocably mounted in the cylinder head in radially spaced relation to a fuel injector 22. Intermediate its ends, the cylinder liner 16 is provided with a plurality of scavenging air admission ports 24 which communicate with a block-defined scavenging air reservoir or air box 26. The air box 26 is, of course, connected to a suitable engine or exhaust turbine driven blower or compressor, not shown. The air admission ports 24 are preferably formed so as to introduce the pressurized scavenging air into the engine cylinder with a swirling motion. The opening of these admission ports is controlled by a piston 30 which is reciprocably mounted within the cylinder liner 16 and cooperates with the closed end of the cylinder structure to define an expansible combustion chamber 28. The piston is connected by a wrist pin 32 and a connecting rod 34 to the engine crankshaft, not shown.

The piston 30 comprises a head or crown portion 36, the upper surface of which forms a movable end wall for the expansible combustion chamber 28, and a skirt portion 38 extending longitudinally from the outer periphery of the crown portion 36. The crown and skirt portions of the piston may be formed separately, but in the embodiment shown are formed integrally of each other, the outer circumferential surfaces thereof being substantially co-extensive. The piston skirt has two outwardly facing circumferential grooves 40 adjacent its lower end and three similar grooves 42 adjacent its upper end which mount expansible oil and compression control rings 44 and 46, respectively. These rings slidably and sealingly engage the bore of the cylinder liner 16.

The piston crown or head 36 is recessed to provide an upwardly facing central bowl 48 which cooperates with the closed end of the cylinder to define an open combustion chamber of the semi-turbulent, toroidal type. Such a combustion chamber is particularly adapted to cooperate with the swirl imparted to the inlet air charge by the ports 24 to insure proper combustion of the injected fuel charge. The toroidal bowl construction of the piston head defines an outer rim 50 of limited radial thickness. The outer periphery of this rim is co-extensive with the upper ring mounting skirt portion 38'. On its underside, the rim 10 is provided with an annular cored recess 52 forming a heat dam which limits metallic heat conduction from the piston head to the skirt portion 38. The underside of the piston head is reinforced inwardly of the recess 52 by two concentric annular bosses 54 and 56. Four struts or legs 58 are co-extensive with and depend longitudinally from the outer boss 56 to two diametrically aligned wrist pin mounting bosses 60 which are formed integrally with and project inwardly from opposite sides of the piston skirt portion 38. The legs 58 define two relatively wide arches 62 extending between the two wrist pin mounting bosses and two relatively narrow arches 64 extending upwardly from each wrist pin boss.

The wrist pin 32 is suitably journaled at 66 within the mounting bosses 60. Two bushings 68 are mounted in spaced axial relation to each other within a bore 70 extending through the adjacent wrist pin end of the connecting rod 34. The bushings 68 serve to pivotally journal the connecting rod on the wrist pin 32. The spaced ends of the bushings 68 mate with an annular groove 72 opening on the bore 70. The groove 72 interconnects a drilled oil supply passage 74 extending longitudinally of the connecting rod with a second bore 76 aligned therewith in the wrist pin end of the connecting rod. The oil supply passage 74 is connectable through suitable passages formed by and in the connecting rod crankpin bearing, the crankshaft and the crankshaft main bearings to the pressurized oil supply system of the engine.

In accordance with the invention, a spray nozzle 80 is carried by the wrist pin end of the connecting rod and is adapted to sequentially spray cooling oil on the inner surfaces of the piston. As best shown in FIGURES 3 and 4, the nozzle 80 comprises a central barrel portion 82 and has a reduced diameter end portion 78 which is inserted and retained in the upper end of the connecting rod bore 76 by suitable means such as a pressed fit. The central barrel portion of the nozzle defines a central chamber 90 which is connectable with the oil supply passages 74, 76 of the connecting rod. Three arms 84, 86 and 88 extend outwardly and upwardly from the central barrel portion 82, as shown, and have drilled nozzle passages 84', 86' and 88' therein which intersect the central nozzle chamber 90. The nozzle arms 84 and 86 are oriented to spray oil through the relatively narrow arches 64 defined between the piston head reinforcing struts 58 onto the portion of the piston skirt defining the compression ring mounting grooves 42 directly above the wrist pin mounting bosses 60 and therefrom into the cored rim recess 52. The third nozzle arm 88 is oriented to direct oil through the strut-defined arch 62 on the power thrust side of the piston (the side to which the reaction of the connecting rod tends to shift the piston on the power stroke) onto the adjacent compression ring mounting groove portion of the piston skirt and therefrom into the cored rim on the power thrust side of the piston. The nozzle arms 84, 86 and 88 thus deliver cooling oil for cooling the compression ring mounting portion of the piston skirt and the cored rim thereof directly behind the head reinforcing struts 58. Two orifice openings 92 and 94 are provided in the upper end of the central barrel 82. The orifice 92 is in axial alignment with the central chamber 90 and the orifice 94 is inclined to intersect the chamber 90 in the plane of but away from the nozzle arm 88. As thus oriented, the nozzle orifices 92 and 94 serve to direct cooling oil streams on the central underside of the piston crown as defined within the intermediate reinforcing boss 56.

Under normal engine operating conditions, inertial forces acting on the oil supplied to the connecting rod passage 74 result in only sequential supply of piston cooling oil through the spray nozzle. Such forces tend to prevent any substantial flow of cooling oil from the spray nozzle 80 from approximately 180° of crankshaft rotation after top center through a quadrant including the entire upward stroke of the crankpin, connecting rod and piston. Substantial flow of cooling oil from the spray nozzle 80 again occurs only after the piston has passed through its top center position. The angle of crankshaft rotation after top center at which the cooling oil flow is again initiated is dependent upon the pressure of the oil supply and the speed of the engine.

By way of illustration, in a two-cycle engine operating at 2,000 r.p.m. with an engine supply gallery pressure at 55 to 60 p.s.i., initial cooling oil flow from the nozzle 80 has been observed to occur at about 60° of crankshaft rotation past top center. The several oil jets reach the corresponding piston surfaces in about fifteen additional degrees of crankshaft rotation. Under the indicated engine operating conditions, initial cooling oil distribution by the spray nozzle 82 thus occurs after approximately 75° of crankshaft rotation past top center. Such initial distribution is shown in FIGURES 7 and 8 wherein rotation of the crankshaft, not shown, is in a left-hand counterclockwise direction. At this instant, the relative rotation between the wrist pin end of the connecting rod and the wrist pin, piston assembly is as indicated by the arrow A in FIGURE 7. The flow of cooling oil from the several arms 84, 86 and 88 and orifices 92 and 94 of the spray nozzle continues until the piston reaches its bottom center position wherein the cooling oil spray distribution patterns are as shown in FIGURES 5 and 6, and the relative rotation between connecting rod and the wrist pin is as indicated by the arrow B in FIGURE 5. As best seen in FIGURES 7 and 9, the orientation of the several nozzle arms 84, 86 and 88 and the inertial effects resulting from the downward reciprocation of the piston and oscillation of the spray nozzle causes the several oil streams emanating from the several nozzle arms 84, 86 and 88 to first sweep the adjacent compression ring mounting portions of the piston skirt immediately above the wrist pin mounting bosses and on the thrust side of the piston with subsequent delivery of the cooling oil into the cored rim area. The oil thus supplied by the several nozzle arms and orifices is retained in piston head cooling relation within the several recesses defined by the cored rim and head reinforcing bosses 54 and 56 during downward reciprocation of the piston. As the piston passes through its bottom center position, such cooling oil is returned to the engine crankcase.

While the foregoing description and drawings have been confined to one illustrative embodiment, it will be readily apparent to those skilled in the art that various modifications might be made therein without departing from the spirit and scope of the invention, as defined in the following claims.

I claim:

1. In an internal combustion engine of the compression ignition type, a cylinder closed at one end and having a plurality of intake ports intermediate the ends thereof, an integral one-piece piston reciprocably mounted in said cylinder and controlling said ports, said piston having a head portion facing the closed end of the cylinder and forming a movable end wall of an expansible combustion chamber formed therebetween, a cylindrical skirt portion extending longitudinally from said head portion, said head and skirt portions having co-extensive outer cylindrical surfaces, intermediate its ends said skirt portion having two diametrically aligned wrist pin mounting bosses formed integrally therewith and extending inwardly therefrom, outwardly said skirt portion having a first plurality of longitudinally spaced circumferential grooves intermediate said wrist pin mounting bosses and the head end of the piston, said first grooves mounting compression sealing rings slidably and sealingly engaging the side walls of said cylinder, said skirt portion having a second plurality of grooves adjacent the opposite end thereof, said second grooves mounting oil control rings slidably and sealingly engaging the side walls of said cylinder, said piston having an annular recess extending between and defining a heat dam of limited cross-sectional dimension between said head and skirt portions, an annular boss depending from and reinforcing said crown portion in spaced concentric relation to said skirt portion and the axis of said piston, a plurality of struts extending between said head reinforcing boss and said wrist pin mounting bosses and defining two arches extending above said wrist pin bosses and two arches extending between said wrist pin bosses, a wrist pin mounted in said wrist pin bosses, a connecting rod having pivotal connection adjacent one end thereof with said wrist pin intermediate said wrist pin mounting bosses and connectable adjacent its opposite end with the crankshaft of the engine, passage means associated with said connecting rod to supply pressurized oil to said wrist pin connection, and spray nozzle means carried by the wrist pin end of said connecting rod and connectable to said oil supply passage means to sequentially spray cooling oil on the underside of said piston, said spray nozzle means comprising two nozzle arms extending laterally of the wrist pin end of said connecting rod and oriented to direct the cooling oil supplied thereto through the two arches extending above the wrist pin bosses and directly onto the adjacent inner surface of the compression ring mounting piston skirt portion and therefrom into the heat dam defining recess opposite the power thrust side of the piston, a third arm connectable to the pressure supply passage means and oriented to direct the oil supplied thereto through the arch extending between said wrist pin mounting bosses on the thrust side of said piston and directly onto the adjacent inner surface of the compression ring mounting piston skirt portion and therefrom into the heat dam defining recess on the thrust side of the piston and orifice means for spraying cooling oil on the underside of said piston head centrally of said head reinforcing boss and struts.

2. In an internal combustion engine, a piston comprising a head portion forming a movable end wall of an expansible combustion chamber and a cylindrical skirt portion extending longitudinally from the periphery of said head portion, intermediate its ends said skirt portion having two diametrically aligned wrist pin mounting bosses formed integrally therewith and extending inwardly therefrom, an annular boss depending from and reinforcing said head portion in spaced concentric relation to said piston skirt portion and cooperating therewith to define a downwardly facing annular groove, a plurality of struts integral with and extending between said head reinforcing and wrist pin mounting bosses to define two arches extending upwardly above said wrist pin bosses and two arches extending between said wrist pin bosses, a wrist pin mounted in and extending between said wrist pin mounting bosses, a connecting rod having pivotal connection adjacent one end thereof with said wrist pin and connectable adjacent its opposite end to the crankshaft of the engine, passage means associated with said connecting rod for supplying pressurized oil, and spray nozzle means carried by the wrist pin end of said connecting rod and connectable to said passage means to spray cooling oil onto the underside of said piston during the downward stroke of said piston, wrist pin and connecting rod, said spray nozzle means comprising two arms extending laterally of the connecting rod and oriented to direct oil through the arches extending above said wrist pin bosses and directly onto the adjacent inner surface of the piston skirt portion and therefrom into said reinforcing boss defined groove on the non-thrust side of the piston, a third arm oriented toward the thrust side of said piston and extended to direct the oil supplied thereto through the adjacent arch extending between said wrist pin bosses and directly onto the adjacent surface of the skirt portion and therefrom into the reinforcing boss defined groove on the thrust side of the piston, and central orifices for spraying cooling oil supplied therethrough onto the underside of said head portion centrally of said reinforcing boss.

3. In an internal combustion engine, a hollow piston comprising a head portion forming a movable end wall of an expansible combustion chamber and a cylindrical skirt portion integral with and extending longitudinally from the periphery of said head portion, said head portion defining a shallow central bowl facing the expansible combustion chamber and cooperating with the adjacent inner surfaces of said skirt portion to define an annular recess thereby forming a heat dam of limited cross-section extending annularly between said head and skirt portions, a first annular boss depending from and reinforcing the central portion of said head defined bowl, a second annular boss depending from and reinforcing said head defined bowl in spaced concentric relation intermediate said skirt portion and said first head reinforcing boss, two diametrically aligned wrist pin mounting bosses formed integrally with and extending inwardly from said piston skirt portion intermediate its ends, and a plurality of arcuate struts formed integrally with and extending between said second head reinforcing boss and said wrist pin mounting bosses to define two arches extending above said wrist pin mounting bosses and two arches extending between said wrist pin mounting bosses, a wrist pin mounted in and extending between said wrist pin mounting bosses, a connecting rod pivotally connected adjacent one end thereof to said wrist pin intermediate the wrist pin mounting bosses, passage means associated with said connecting rod for supplying pressurized oil to said pivotal connection and nozzle means carried by the wrist pin connected end of said connecting rod for spraying cooling oil on the inner surfaces of said piston, said nozzle means comprising two arms extending laterally of the connecting rod and oriented to direct oil through said arches extending above said wrist pin bosses and directly onto the adjacent inner surface of the piston skirt portion and therefrom into said heat dam recess on the non-thrust side of the piston, a third arm oriented toward the thrust side of said piston and extended to direct the oil supplied thereto through the adjacent arch extending between said wrist pin bosses and directly onto the adjacent surface of the skirt portion and therefrom into the heat dam recess on the thrust side of the piston, and orifice means for spraying cooling oil supplied hereethrough onto the underside of said head portion centrally of said head reinforcing struts and intermediate boss.

4. In an internal combustion engine, a piston having a head portion forming a movable end wall of an expansible combustion chamber and having a circumferential skirt portion extending longitudinally from said head portion, said head and skirt portions have co-extensive outer cylindrical surfaces and inwardly defining an annular recess thereby forming a heat dam of limited cross-sectional dimension between said head and skirt portions, an annular boss depending from and reinforcing said crown portion in spaced concentric relation to said skirt portion and the axis of said piston, a plurality of arcuate struts extending between said head reinforcing boss and said skirt portion intermediate its ends and defining a plurality of arches therebetween, a connecting rod having pivotal connection with said piston, passage means associated with said connecting rod for supplying pressurized oil, and spray nozzle means carried by and connectable to said oil supply passage means of said connecting rod for spraying cooling oil on the underside of said piston, said spray nozzle means comprising a plurality of nozzle arms extending laterally of the connecting rod and oriented to direct the cooling oil supplied thereto through said arches and directly onto the adjacent inner surface of said piston skirt portion and therefrom into the heat dam defining recess, and central orifice means for spraying cooling oil on the underside of said piston head centrally of said head reinforcing boss and struts.

5. In an internal combustion engine, a hollow piston comprising a head portion forming a movable end wall of an expansible combustion chamber and a cylindrical skirt portion integral with and extending longitudinally from the periphery of said head portion, said head portion defining a shallow central bowl facing the expansible combustion chamber and cooperating with the adjacent inner surfaces of said skirt portion to define an annular recess thereby defining a heat dam of limited longitudinal cross-section extending annularly between said head and skirt portions, an annular boss depending from and reinforcing said head defined bowl in spaced concentric relation intermediate said skirt portion and the axis of said piston, and a plurality of struts of arcuate cross-section formed integrally with and extending between said head reinforcing boss and said skirt portion intermediate its ends and defining a plurality of arches therebetween, a connecting rod having pivotal connection with said piston, passage means associated with said connecting rod for supplying pressurized oil to said pivotal connection, and nozzle means carried by said connecting rod and connectable to said passage means for spraying cooling oil on the inner surfaces of said piston, said nozzle means comprising a plurality of arms extending laterally of the connecting rod and oriented to direct oil through said arches and directly onto the adjacent inner surface of the piston skirt portion and therefrom into said heat dam defining recess and having orifices therein oriented to spray cooling oil onto the underside of said head portion centrally of said head reinforcing boss and struts.

References Cited in the file of this patent

UNITED STATES PATENTS

| | | |
|---|---|---|
| 2,046,196 | Truxell | June 30, 1936 |
| 2,092,599 | Brill | Sept. 7, 1937 |
| 2,108,194 | Church | Feb. 15, 1938 |
| 2,386,117 | Hvid | Oct. 2, 1945 |
| 2,523,699 | Holt et al. | Sept. 26, 1950 |